(12) United States Patent
Odo et al.

(10) Patent No.: US 10,184,370 B2
(45) Date of Patent: Jan. 22, 2019

(54) OIL SEPARATION DEVICE FOR INTERNAL COMBUSTION ENGINE

(71) Applicant: HONDA MOTOR CO., LTD., Tokyo (JP)

(72) Inventors: Mayuka Odo, Wako (JP); Masahiro Nakajima, Wako (JP); Kazuhiro Aoki, Wako (JP)

(73) Assignee: Honda Motor Co., Ltd.

( * ) Notice: Subject to any disclaimer, the term of this patent is extended or adjusted under 35 U.S.C. 154(b) by 0 days.

(21) Appl. No.: 15/728,084

(22) Filed: Oct. 9, 2017

(65) Prior Publication Data
US 2018/0142587 A1 May 24, 2018

(30) Foreign Application Priority Data

Nov. 21, 2016 (JP) .................. 2016-226241

(51) Int. Cl.
*F01M 13/04* (2006.01)
*F01M 9/10* (2006.01)
(Continued)

(52) U.S. Cl.
CPC .......... *F01M 13/0416* (2013.01); *F01M 9/10* (2013.01); *F01M 9/101* (2013.01); *B01D 45/08* (2013.01); *F01L 1/053* (2013.01); *F01L 2001/0475* (2013.01); *F01L 2001/0476* (2013.01); *F01L 2001/0537* (2013.01); *F01M 2013/0461* (2013.01); *F02F 1/24* (2013.01)

(58) Field of Classification Search
CPC ......... B01D 45/08; B01D 45/16; F01L 1/053; F01M 9/101; F01M 13/0416; F01M 2013/0461; F02F 7/006; F02M 35/0226; F02M 35/10222

USPC ............................................ 123/90.27, 90.38
See application file for complete search history.

(56) References Cited

U.S. PATENT DOCUMENTS

2013/0312720 A1* 11/2013 Aquino .................. F02M 25/06
   123/573
2016/0265404 A1* 9/2016 Fujii .................. F01M 13/0416
2017/0356316 A1* 12/2017 Suzuki .................. B01D 45/06

FOREIGN PATENT DOCUMENTS

JP    2005337123 A    12/2005
JP    2008121478 A    5/2008
(Continued)

OTHER PUBLICATIONS

Decision to Grant a Patent, Japanese Patent Application No. 2016-226241, dated Sep. 7, 2018, 6 pages: with English translation.
(Continued)

*Primary Examiner* — Jorge Leon, Jr.
(74) *Attorney, Agent, or Firm* — Armstrong Teasdale LLP

(57) ABSTRACT

An oil separation device of an internal combustion engine includes a gas liquid separation chamber defined by a head cover of the engine, a gas introduction passage connected to a first end of the gas liquid separation chamber at an angle to the first direction, a gas inlet formed in an end of the gas introduction passage remote from the gas liquid separation chamber, and a gas outlet formed in a second end of the gas liquid separation chamber. Oil splashed from a valve actuating chamber of the engine is prevented from entering the oil separation device, and oil mist can be effectively separated from blow by gas.

13 Claims, 6 Drawing Sheets

(51) Int. Cl.
    *B01D 45/08*     (2006.01)
    *F01L 1/053*     (2006.01)
    *F02F 1/24*     (2006.01)
    *F01L 1/047*     (2006.01)

(56) References Cited

FOREIGN PATENT DOCUMENTS

| | | |
|---|---|---|
| JP | 2011256761 A | 12/2011 |
| JP | 2012057498 A | 3/2012 |
| JP | 2003293725 A | 10/2013 |
| JP | 2015094239 A | 5/2015 |
| JP | 2016023631 A | 2/2016 |

OTHER PUBLICATIONS

Japanese Office Action issued in Japanese Patent Application No. 2016-226241, dated Jul. 24, 2018.

\* cited by examiner

OIL SEPARATION DEVICE FOR INTERNAL COMBUSTION ENGINE

TECHNICAL FIELD

The present invention relates to an oil separation device for an internal combustion engine, and in particular to an oil separation device which is suitable for separating oil mist from blow by gas.

BACKGROUND ART

It is known to provide an oil separation device in a blow by gas passage for returning blow by gas from a crank chamber to an intake system in an internal combustion engine. JP4043825B and JP4353473B disclose that a gas liquid separation chamber provided with a plurality of baffle plates may be incorporated in a head cover formed by combining a plurality of members. As the blow by gas containing oil mist flows from an inlet to an outlet of the gas liquid separation chamber, the blow by gas collides with the baffle plates and changes directions so that the oil mist adheres to the baffle plates owing to the inertia of the oil mist, and is separated from the blow by gas.

JP2016-023631A discloses an oil separation device for an internal combustion engine that includes a gas liquid separation chamber elongated in a prescribed direction and defining a spiral passage. To define the spiral passage, the gas liquid separation chamber of this oil separation device is provided with a plurality of slanted upright walls extending from the bottom wall thereof at a first angle to a direction orthogonal to the prescribed direction in plan view and arranged in the prescribed direction, and a plurality of slanted depending walls extending from the top wall thereof at a second angle to the direction orthogonal to the prescribed direction in plan view and arranged in the prescribed direction, the first and second angles being in mutually opposite senses.

In the case of an oil separation device for an internal combustion engine, an oil separation chamber is typically formed in an engine cover defining a valve actuating chamber in cooperation with the upper surface of the cylinder head, and a gas inlet of the gas oil separation chamber communicates with the valve actuating chamber. Therefore, oil splashed by a moving part in the valve actuating chamber such as a camshaft may be introduced into the gas inlet.

SUMMARY OF THE INVENTION

In view of such a problem of the prior art, a primary object of the present invention is to provide an oil separation device for an internal combustion engine which can effectively prevent splashed oil from entering the oil separation device.

A second object of the present invention is to provide an oil separation device for an internal combustion engine which can effectively separate oil mist from blow by gas.

To achieve such objects, the present invention provides an oil separation device of an internal combustion engine, comprising; a gas liquid separation chamber (70) defined by a chamber forming member (41, 42) and elongated in a horizontal first direction; a gas introduction passage (71) connected to a first end of the gas liquid separation chamber at an angle to the first direction; a gas inlet (54) formed in an end of the gas introduction passage remote from the gas liquid separation chamber; and a gas outlet (59) formed in a second end of the gas liquid separation chamber.

Because the path of the gas from the gas introduction passage to the gas liquid separation chamber is bent in the shape of letter L in plan view, foreign matter such as oil mist contained in the gas entering the gas introduction passage is in large part prevented from reaching the main part of the gas liquid separation chamber.

According to a preferred embodiment of the present invention, the chamber forming member is formed by a part of a head cover (41, 42) of the engine, the head cover defining a valve actuating chamber (44) in cooperation with an upper surface of a cylinder head (3) of the engine, and the valve actuating chamber accommodating a camshaft (47) extending in the first direction substantially directly under the gas liquid separation chamber, the gas inlet being spaced apart from the camshaft in a direction orthogonal to the first direction than the gas liquid separation chamber.

Thus, the oil separation device can be advantageously utilized for removing oil mist contained in blow by gas. In particular, because the gas inlet is spaced apart from the camshaft that splashes oil in the valve actuating chamber, the advantageous positioning of the gas introduction passage prevents the splashed oil from entering the gas introduction passage.

Preferably, a circumferential motion of the camshaft at a top side thereof is directed from a side of the gas liquid separation chamber to a side of the gas inlet.

Thus, by facing the gas inlet of the gas introduction passage away from the direction in which oil is splashed by the camshaft, the splashed oil is favorably prevented from entering the gas introduction passage.

Preferably, the camshaft is supported by a plurality of cam holders (49) via bearings, and the gas introduction passage substantially aligns with one of the cam holders.

The part corresponding to the cam holder is relatively free from splashed oil so that the splashed oil is particularly favorably prevented from entering the gas introduction passage.

Preferably, the gas introduction passage is provided with a bottom wall (71A) defining a bottom wall surface slanting upward from the gas inlet to the gas liquid separation chamber.

Thereby, any oil deposited on the bottom wall surface of the gas introduction passage is guided toward the gas inlet by the gravitational force so that oil that may be present in the gas introduction passage can be readily removed.

Preferably, the bottom wall is provided with a depending wall (74) depending downward from a lower surface of the bottom wall adjacent to the gas inlet and extending in the first direction.

The depending wall prevents the oil adhered to the lower surface of the bottom wall from reaching the gas inlet where the oil could be otherwise entrained in the blow by gas flow entering the gas inlet.

According to a certain aspect of the present invention, the gas introduction passage is provided with a top wall surface which is substantially lower than a top wall surface of the gas liquid separation chamber, and a part of the gas liquid separation chamber adjoining the gas introduction passage is provided with an upright wall (70M) extending upright from a bottom wall (70A) of the gas liquid separation chamber and at an angle to the first direction in plan view.

The cross sectional area of the passage abruptly increases as the gas progresses from the gas introduction passage to the gas liquid separation chamber so that the velocity of the gas abruptly drops while heavier foreign matter continues to travel at a higher velocity. As a result, the foreign matter can be favorably separated from the gas. Furthermore, the upright wall causes the gas flow to be deflected upward, and this also contributes to the separation of heavier foreign matter from the gas.

Preferably, the gas liquid separation chamber is provided with a depending wall (70N) in a part thereof intermediate between the upright wall and the gas introduction passage.

The depending wall ensures that the gas is initially directed toward the bottom wall surface before ascending along the upright wall so that heavier foreign matter can be separated from the gas in an even more effective manner.

Preferably, the upright wall extends from one of a pair of side walls (70C, 70D) of the gas liquid separation chamber, and is spaced from the other of the side walls, and a first side rib (70P) extends from a part of the other side wall located adjacent to the upright wall from a side remote from the gas introduction passage.

The oil separated from the gas in the gas liquid separation chamber is allowed to flow toward the gas introduction passage via the gap between the upright wall and the other side wall, and the first side rib prevents the oil flowing through the gap from being blown away from the gas introduction passage by the gas flowing from the gas inlet to the gas outlet.

According to another aspect of the present invention, the gas liquid separation chamber is provided with a plurality of slanted upright walls (70H) extending from a bottom wall (70A) thereof at a first angle to a direction orthogonal to the first direction in plan view and arranged in the first direction, and a plurality of slanted depending walls (70J) depending from a top wall (70B) thereof at a second angle to the direction orthogonal to the first direction in plan view and arranged in the first direction, the first and second angles being in mutually opposite senses.

A spiral passage for the gas flow is defined by the slanted upright walls and slanted depending walls so that oil mist can be separated from the gas in an efficient manner by centrifugal force.

It is preferable in this conjunction if the slanted upright walls are spaced from one of a pair of side walls (70C, 70D) of the gas liquid separation chamber, and a second side rib (70Q) extends from a part of the one side wall located adjacent to at least one of the slanted upright walls from a side remote from the gas introduction passage.

The oil separated from the gas in the gas liquid separation chamber is allowed to flow toward the gas introduction passage via the gap between the slanted upright walls and the one side wall, and the second side rib prevents the oil flowing through the gap from being blown away from the gas introduction passage by the gas flowing from the gas inlet to the gas outlet.

According to yet another aspect of the present invention, the slanted upright walls are spaced from one of a pair of side walls (70C, 70D) of the gas liquid separation chamber, and the gas liquid separation chamber is provided with a bottom wall surface which is slanted downward toward a side of the gas introduction passage and toward the one side wall.

Thereby, the oil that is separated from the gas in the gas liquid separation chamber can flow toward the one side wall, and then toward the gas introduction passage by the gravitational force so that the oil separated from the gas in the gas liquid separation chamber can be quickly removed from the gas liquid separation chamber.

Alternatively or additionally, the bottom wall of the gas liquid separation chamber may be provided with a descending step (73) toward the gas introduction passage.

This also contributes to the quick removal of oil from the gas liquid separation chamber by the gravitational force.

BRIEF DESCRIPTION OF THE DRAWING(S)

DESCRIPTION OF THE PREFERRED EMBODIMENT(S)

A preferred embodiment of the present invention is described in the following with reference to the appended drawings.

Figure 1:
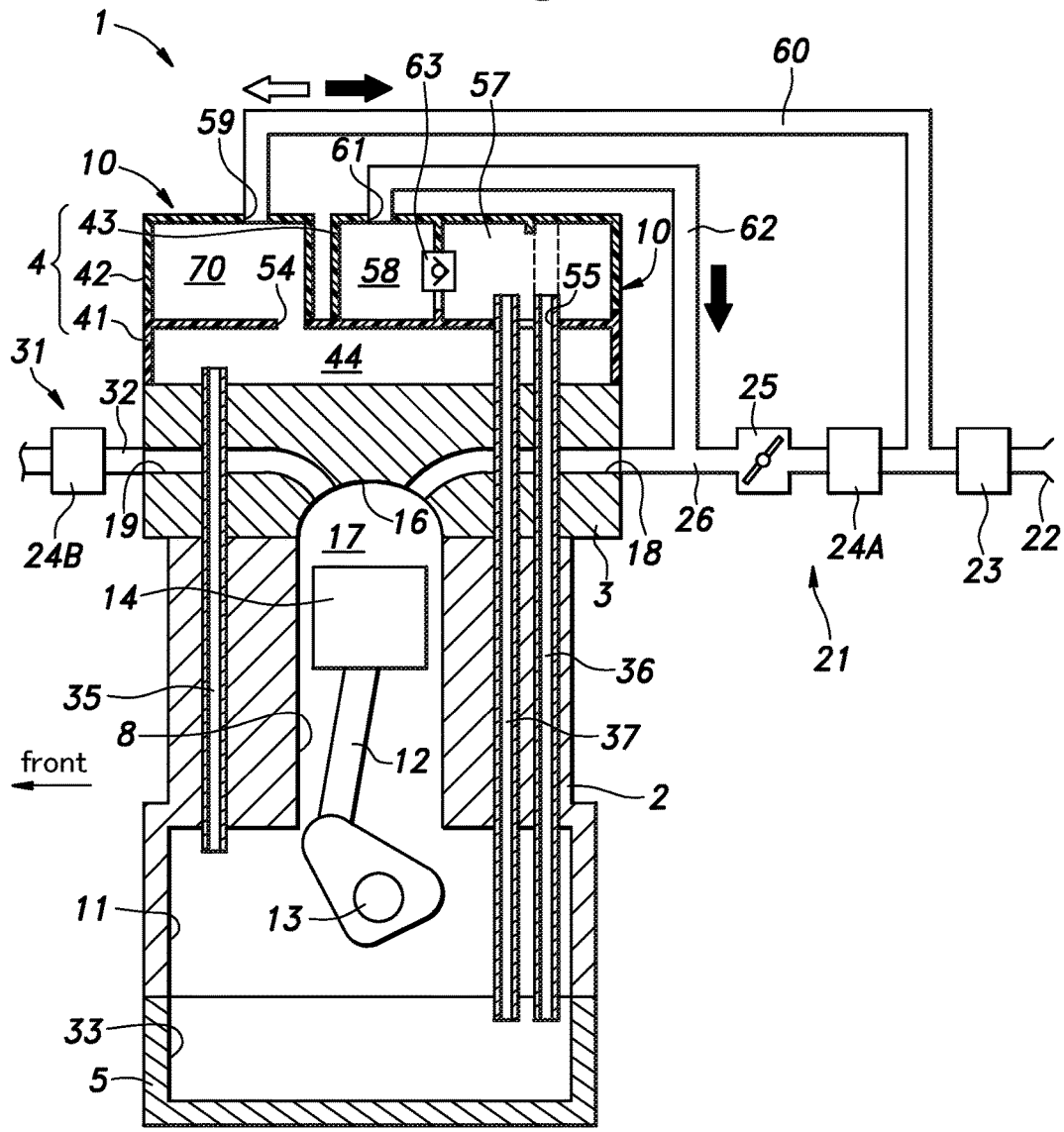
FIG. 1 is a schematic diagram of an internal combustion engine provided with an oil separation device according to an embodiment of the present invention.

The internal combustion engine 1 according to the present embodiment consists of an in-line four-cylinder reciprocating engine. As shown in FIG. 1, the internal combustion engine 1 includes a cylinder block 2, a cylinder head 3 coupled to an upper end of the cylinder block 2, a head cover 4 coupled to an upper end of the cylinder head 3, and an oil pan 5 coupled to a lower end of the cylinder block 2. The head cover 4 is internally provided with a pair of oil separation devices 10 for removing oil from the gas circulating within the engine 1 such as blow by gas.

The cylinder block 2 internally defines four cylinders 8. The cylinders 8 are arranged in a single row extending along a direction which may be defined as a cylinder row direction. The cylinder axial lines are described as extending in the vertical direction in the following disclosure for the convenience of description. Since the engine is mounted laterally on the vehicle, the cylinder row direction may also be referred to as a lateral direction. In the illustrated embodiment, the front side of the engine 1 corresponds to the exhaust side of the engine, and the rear side of the engine corresponds to the intake side of the engine. The cylinders 8 are named a first, a second, a third and a fourth cylinder in that order from the left side to the right side from the view point of the vehicle driver.

The upper end of each cylinder 8 opens out at the upper surface of the cylinder block 2 and the lower end of the cylinder 8 communicates with a crank chamber 11 formed in the lower part of the cylinder block 2 in cooperation with the oil pan 5. A piston 14 connected to the crankshaft 13 via a connecting rod 12 is slidably received in each cylinder 8. The axis of the crankshaft 13 extends in the lateral direction.

Figure 3:
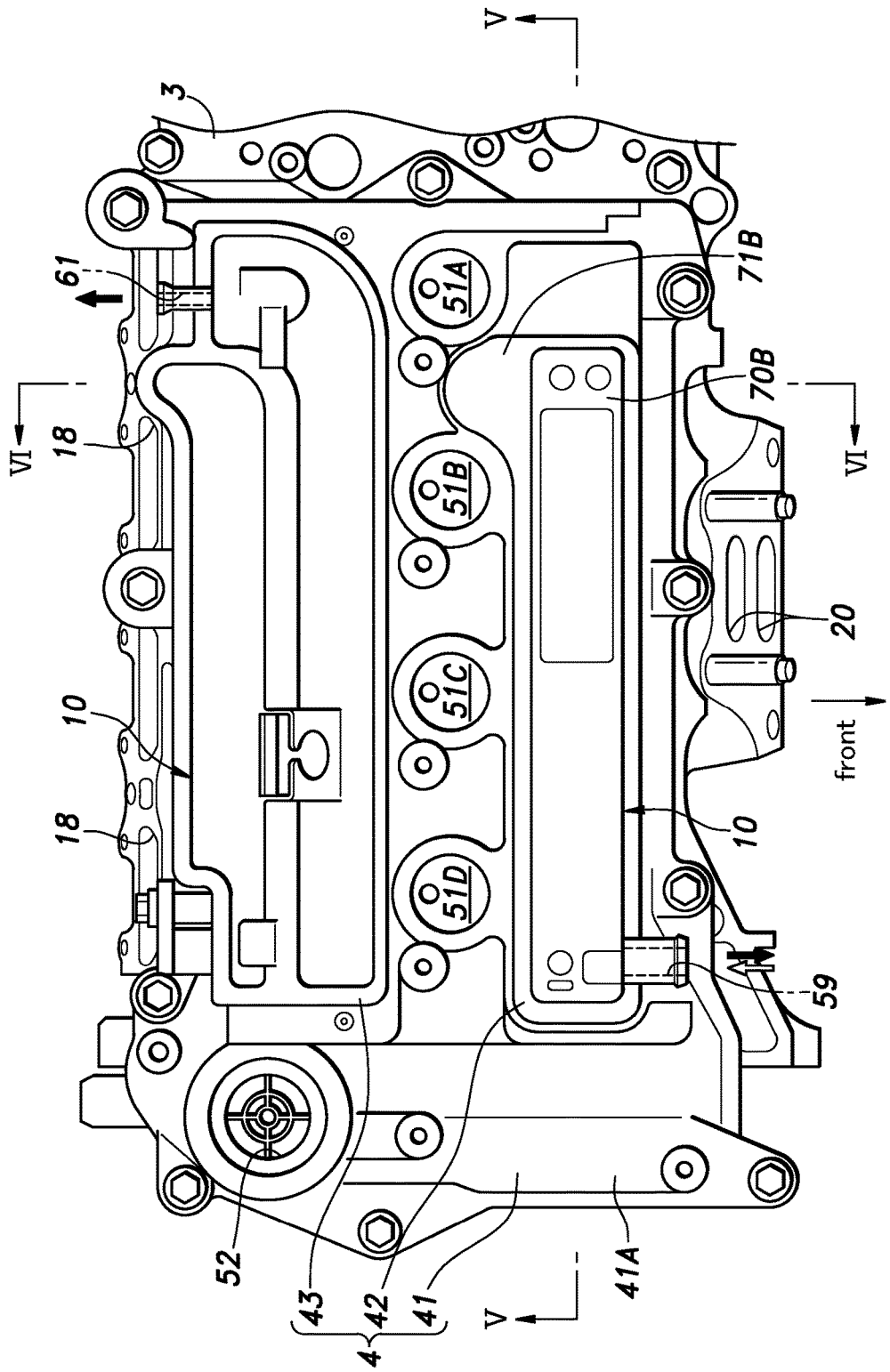
FIG. 3 is a plan view of the internal combustion engine.

The cylinder head 3 extends in the cylinder row direction, and is provided with four combustion chamber recesses 16 in positions corresponding to the respective cylinders 8 on the lower surface thereof. Each combustion chamber recess 16 forms a combustion chamber 17 in cooperation with the cylinder 8. An intake port 18 extends from each combustion chamber recess 16 to the rear side of the cylinder head 3 and an exhaust port 19 extends from the combustion chamber recess 16 to the front side of the cylinder head 3. In the illustrated embodiment, the cylinder head 3 is internally incorporated with an exhaust manifold 32, and a common outlet end 20 of the exhaust manifold 32 opens out at the front side of the cylinder head 3 as shown in FIG. 3.

As shown in FIG. 1, the internal combustion engine 1 is provided with an intake system 21 that includes an air inlet 22, an air cleaner 23, a turbocharger compressor 24A, a throttle valve 25, and an intake manifold 26 in that order from the upstream side. The intake manifold 26 is coupled to the cylinder head 3 and communicates with the intake ports 18. The exhaust system 31 of the internal combustion engine 1 includes, in addition to the exhaust manifold 32, a turbocharger turbine 24B, a catalytic converter (not shown in the drawings), a muffler (not shown in the drawings), and an exhaust outlet (not shown in the drawings) in that order from the upstream side.

The oil pan 5 is formed in a box shape having an open upper end, and is coupled to a lower portion of the cylinder block 2 to form an oil reservoir 33.

An oil return passage 35 is passed vertically through the cylinder head 3 and the cylinder block 2. The lower end of the oil return passage 35 communicates with an upper part of the crank chamber 11. A blow by gas passage 36 and a gauge passage 37 are similarly passed through the cylinder head 3 and the cylinder block 2.

The oil return passage 35 is configured to return the oil collected on the upper surface of the cylinder head 3 to the oil reservoir 33 via the crank chamber 11. The blow by gas passage 36 is located between the first cylinder 8 and the second cylinder 8 and is disposed further rearward than the cylinders 8. The gauge passage 37 is configured to accept an oil level gauge for measuring the oil level in the oil reservoir 33.

Figure 2:
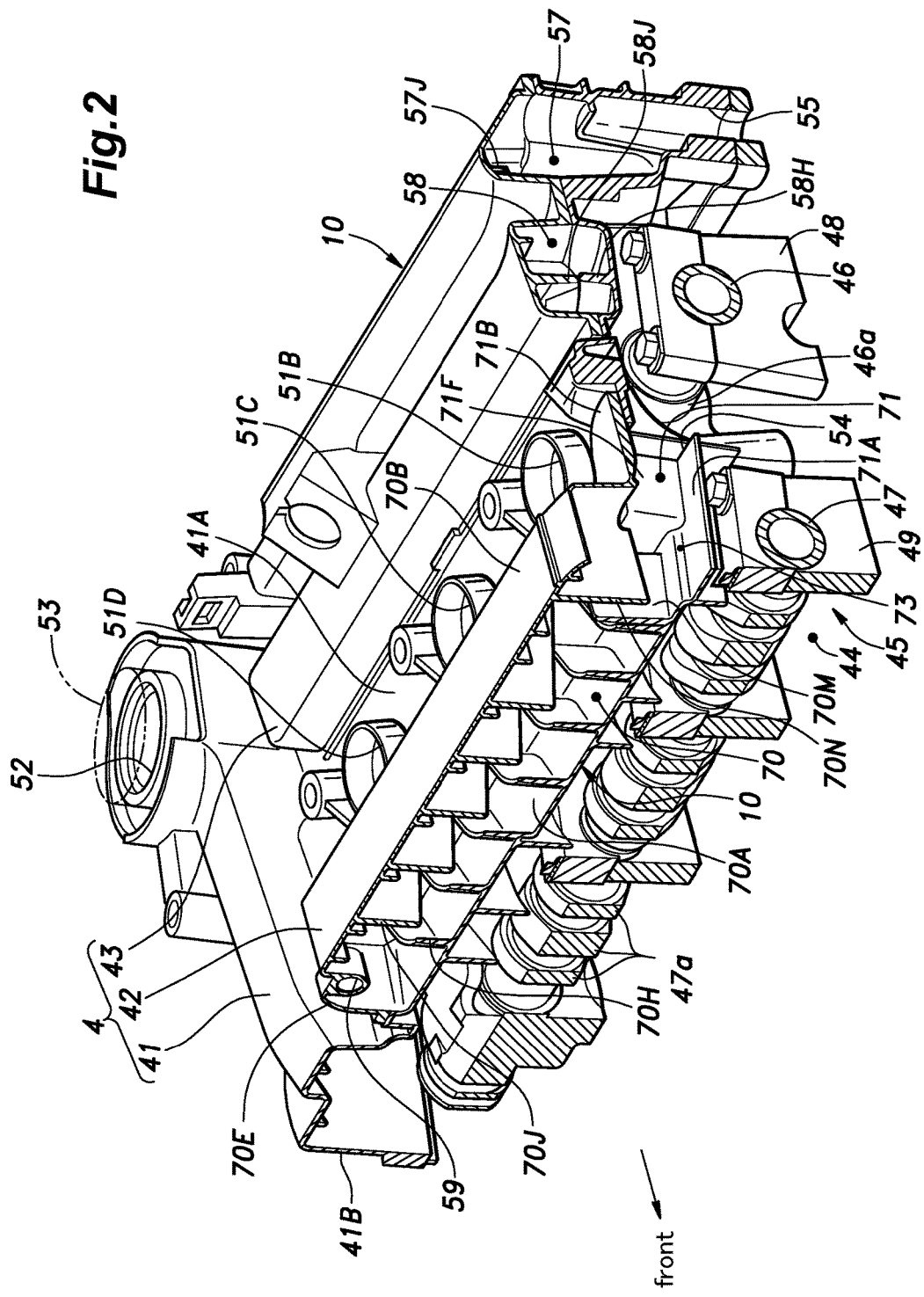
FIG. 2 is a fragmentary perspective view showing a main part of the internal combustion engine partly in section.
Figure 4:
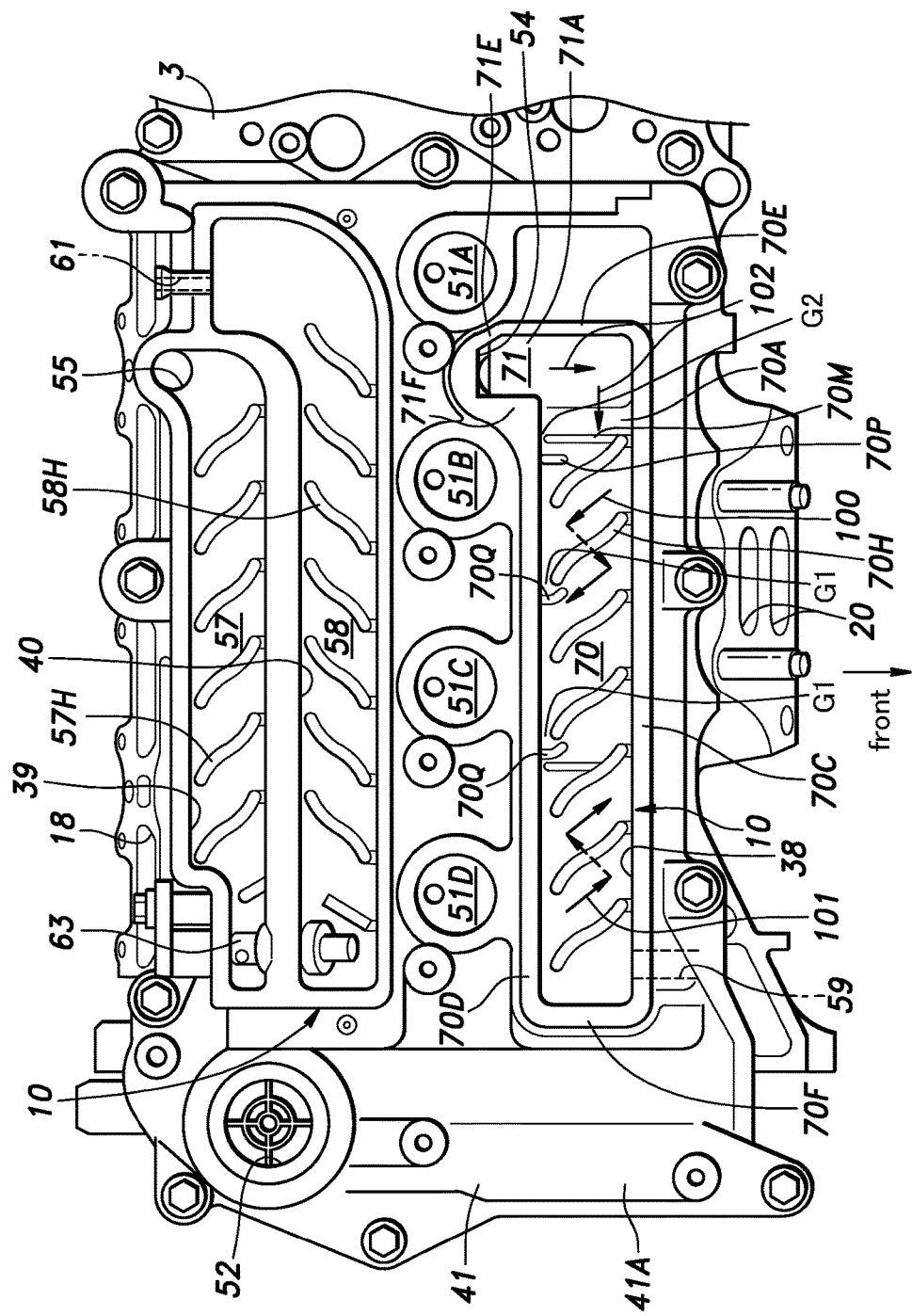
FIG. 4 is a plan view of the internal combustion engine with a second and a third cover member removed.

As shown in FIGS. 2 to 4, the head cover 4 includes a first cover member 41 extending substantially over the entire upper surface of the cylinder head 3. The first cover member 41 includes a top wall 41A and a side wall 41B that depends from the peripheral edge of the top wall 41A. The side wall 41B of the first cover member 41 abuts the upper end of the cylinder head 3. The first cover member 41 defines a valve actuating chamber 44 in cooperation with the cylinder head 3.

Figure 5:
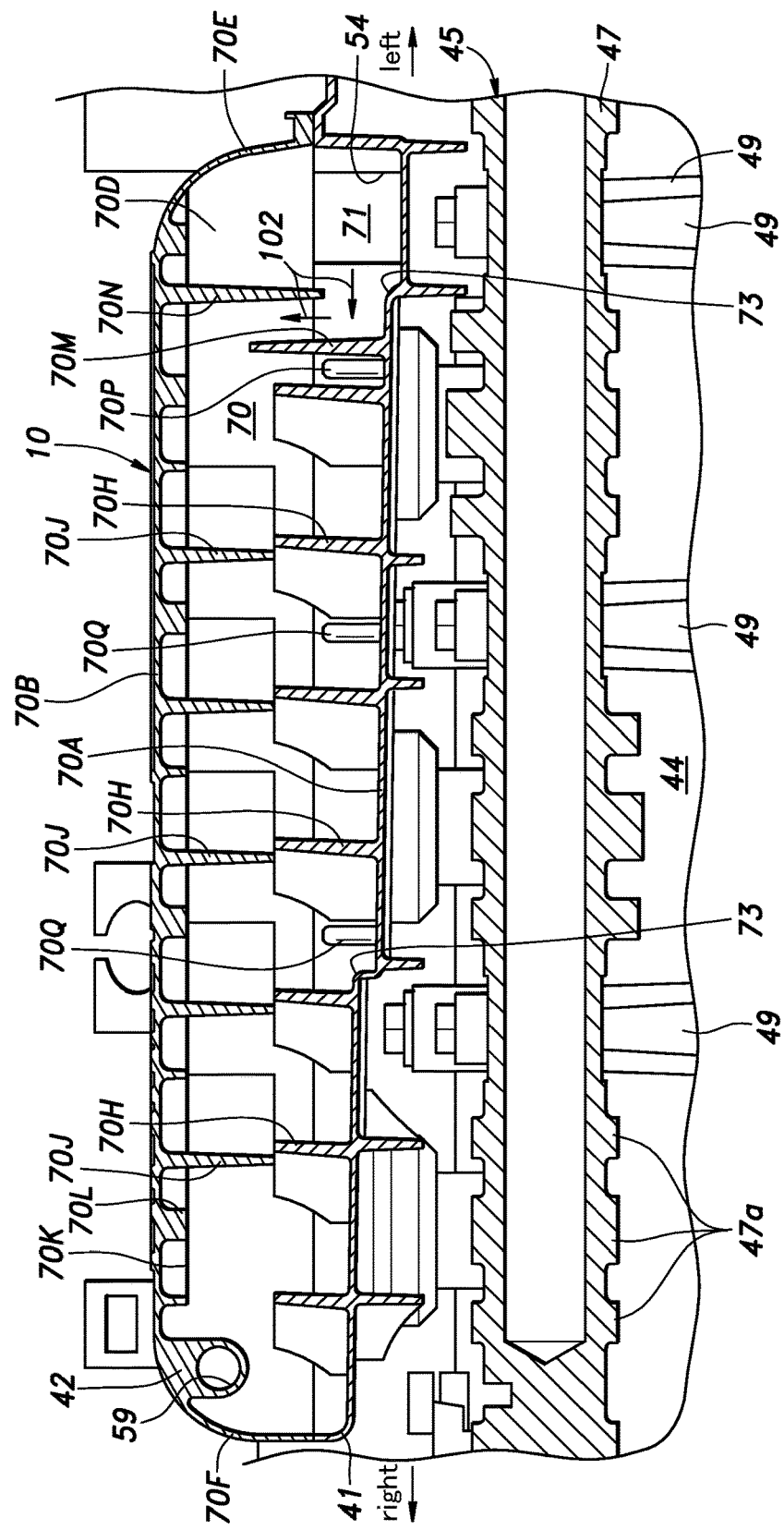
FIG. 5 is a sectional view taken along line V-V of FIG. 3.
Figure 6:
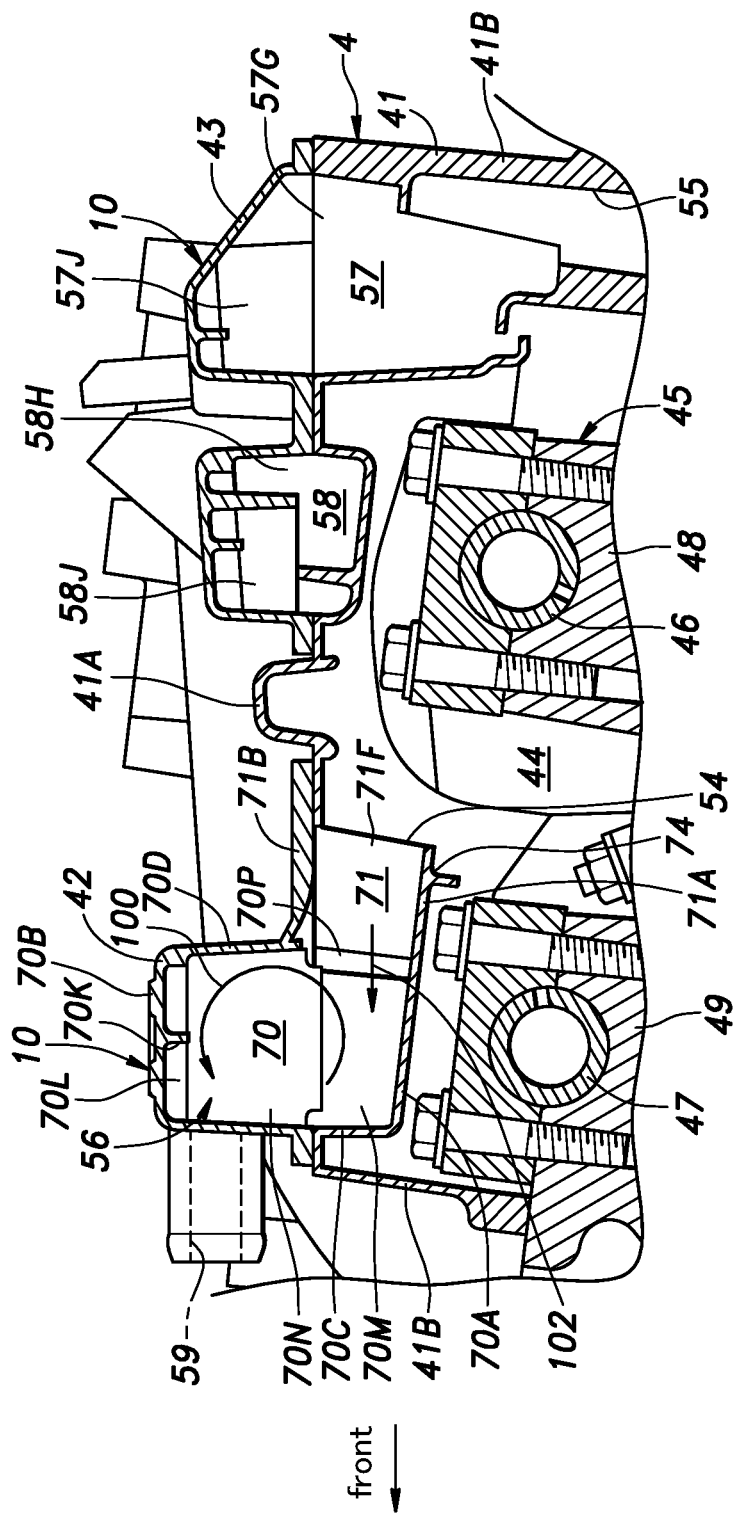
FIG. 6 is a sectional view taken along line VI-VI of FIG. 3.

As shown in FIGS. 2, 5, and 6, the valve actuating chamber 44 accommodates a per se known valve actuating mechanism 45. The valve actuating mechanism 45 includes an intake camshaft 46 extending along a rear portion of the valve actuating chamber 44 in the cylinder row direction, and an exhaust camshaft 47 extending along a front portion of the valve actuating chamber 44 in the cylinder row direction. The intake camshaft 46 is provided with four sets of cams 46a corresponding to the respective cylinders 8, and is rotatably supported by the cylinder head 3 via five intake cam holders 48. The intake camshaft 46 drives the intake valves via intake rocker arms. The exhaust camshaft 47 is provided with four sets of cams 47a corresponding to the respective cylinders 8 and is rotatably supported by the cylinder head 3 via five exhaust cam holders 49. The exhaust camshaft 47 drives the exhaust valves via exhaust rocker arms. Each set of cams may include a plurality of cam profiles for variably driving the corresponding intake or exhaust valve or valves.

As shown in FIGS. 2 to 4, plug holes 51A to 51D for inserting spark plugs are passed through the top wall 41A of the first cover member 41 at positions corresponding to spark plug holes formed in the cylinder head 3. The plug holes 51A to 51D are numbered as first, second, third and fourth in that order from the left side so as to correspond to the numbering of the cylinders 8.

An oil filler hole 52 is formed in a part of the top wall 41A of the first cover member 41 on the right rear side of the fourth plug hole 51D. An oil filler cap 53 (FIG. 2) is detachably attached to the oil filler hole 52. When refilling the oil, the user removes the oil filler cap 53 and pours oil into the oil filler hole 52. The oil poured into the oil filler hole 52 flows onto the upper surface of the cylinder head 3, and then flows downward through the oil return passage 35 to the oil reservoir 33.

As shown in FIG. 4, the first cover member 41 is formed with a first to a third recesses 38 to 40 each extending along the cylinder row direction. The first recess 38 extends along the front side of the cylinder head 3, while the second and third recess 39 and 40 extend along the rear side of the cylinder head 3. A second cover member 42 elongated in the cylinder row direction and box-shaped with an open lower end is attached to the upper side of the first cover member 41 so as to correspond to the first recess 38 and jointly define a first gas liquid separation passage 70 (gas liquid separation chamber). A third cover member 43 elongated in the cylinder row direction and box shaped with an open lower end is attached to the upper side of the first cover member 41 so as to correspond to the second recess 39 and the third recess 40 and jointly define a second gas liquid separation passage 57 and a third gas liquid separation passage 58, respectively.

The left end of the first recess 38 is bent rearward by a 90 degree angle, and is closed by a flange of the second cover member 42 extending laterally along the lower edge thereof from above so as to define a gas introduction passage 71.

The rear end of the gas introduction passage 71 communicates with the valve actuating chamber 44 via a gas inlet 54 at a part intermediate between the first plug hole 51A and the second plug hole 51B.

The left end (which is also intermediate between the first plug hole 51A and the second plug hole 51B with respect to the cylinder row direction) of the second recess 39 is formed with a gas inlet hole 55 that communicates with the upper end of the blow by gas passage 36.

The first gas liquid separation passage 70 extends in the cylinder row direction on the front side of the plug holes 51A to 51D, or on the exhaust side. The left end of the first gas liquid separation passage 70 corresponds to the space between the first and second plug holes 51A and 51B with respect to the cylinder row direction, and is connected to the gas introduction passage 71 which extends rearward to a part located between the first and second plug holes 51A and 51B. The right end of the first gas liquid separation passage 70 is disposed to the right of the fourth plug hole 51D with respect to the cylinder row direction. In other words, the first gas liquid separation passage 70 and the gas introduction passage 71 jointly forms an L shaped passage in plan view. The gas inlet 54 opens rearward at the rear end of the gas introduction passage 71.

Meanwhile, a gas outlet 59 is formed in the upper part (the second cover member 42) of a front side wall 70C of the first gas liquid separation passage 70 adjacent to the right end of the first gas liquid separation passage 70.

As can be seen from FIGS. 5 and 6, the first gas liquid separation passage 70 is disposed directly above the exhaust camshaft 47 and extends along the exhaust camshaft 47. The gas introduction passage 71 is disposed directly above the second exhaust cam holder 49 as counted from the left, and the gas inlet 54 is disposed further away from the exhaust camshaft 47 than the first gas liquid separation passage 70.

The first gas liquid separation passage 70 is provided with a lower wall 70A, a top wall 70B, a front side wall 70C, a rear side wall 70D, a left side wall 70E, and a right side wall

70F. The lower wall 70A of the first gas liquid separation passage 70 is provided by the top wall 41A of the first cover member 41, and a plurality of steps 73 (two in the example of FIG. 5) descending from right to left are formed in the lower wall 70A of the first gas liquid separation passage 70. Furthermore, the lower wall 70A is slanted downward toward the gas introduction passage 71. The upper wall 70B of the first gas liquid separation passage 70 is provided by the second cover member 42. The front side wall 70C, the rear side wall 70D, the left side wall 70E, and the right side wall 70F of the first gas liquid separation passage 70 are provided jointly by the recessed part of the first cover member 41 and the second cover member 42.

As shown in FIGS. 4 and 6, the gas introduction passage 71 is provided with a lower wall 71A, an upper wall 71B, a left side wall 71E, and a right side wall 71F. The lower wall 71A of the gas introduction passage 71 extending rearward is provided by an integral extension of the top wall 41A of the first cover member 41. The upper surface or the inner surface of the lower wall 71A of the gas introduction passage 71 has an upward slant toward the first gas liquid separation passage 70. The upper wall 71B of the gas introduction passage 71 is provided by a flange of the second cover member 42 extending rearward from the lower edge of the side wall of the second cover member 42. Therefore, the inner surface of the upper wall 71B of the gas introduction passage 71 is lower than the inner surface of the upper wall 70B of the first gas liquid separation passage 70. A part of the lower surface of the lower wall 71A adjacent to the gas inlet 54 is provided with a rib 74 projecting from the outer or lower side of the lower wall 71A and extending in the cylinder row direction for preventing oil splashed by the exhaust camshaft 47 from entering the gas inlet 54.

The right side wall 71F of the gas introduction passage 71 extends rearward from the left edge of the rear side of the recess 38 formed in the first cover member 41. The left side wall 71E extends rearward from the left edge of the front side of the recess 38 of the first cover member 41. In the illustrated embodiment, the gas introduction passage 71 extends orthogonally relative to the first gas liquid separation passage 70 which extends in the cylinder row direction.

As shown in FIG. 1, the gas outlet 59 is connected to a passage connected between the air cleaner 23 and the compressor 24A of the intake system 21 via a gas passage 60 which may consist of a hose or a rigid pipe. The gas outlet 59 functions both as a gas discharge port for discharging blow by gas from the first gas liquid separation passage 70 to the intake system 21 as indicated by a black arrow and as a fresh air introduction port for introducing fresh air from the intake system 21 to the first gas liquid separation passage 70 as shown by a white outlined arrow in FIGS. 1 and 3.

As shown in FIG. 4, the second gas liquid separation passage 57 extends in the cylinder row direction behind the plug holes 51A to 51D, or on the intake side. The left end of the second gas liquid separation passage 57 is disposed in a part corresponding to the space between the first and second plug holes 51A and 51B with respect to the cylinder row direction, and the right end is disposed on the right side of the fourth plug hole 51D with respect to the cylinder row direction.

The lower wall surface of the second gas liquid separation passage 57 is inclined downward from the right end side to the left end side (as well as from the front side to the rear side) so that liquid on the lower wall surface flows toward the gas inlet hole 55 on the left end side of the second gas liquid separation passage 57 by gravity.

The third gas liquid separation passage 58 extends in the cylinder row direction behind the plug holes 51A to 51D and on the front side of the second gas liquid separation passage 57. The left end of the third gas liquid separation passage 58 is disposed in a part corresponding to the first plug hole 51A with respect to the cylinder row direction, and the right end thereof is arranged on the right side of the fourth plug hole 51D with respect to the cylinder row direction. The left end of the third gas liquid separation passage 58 is curved rearward toward the left end of the second gas liquid separation passage 57.

A gas outlet hole 61 is formed at the left end part of the rear side wall of the third gas liquid separation passage 58. As shown in FIG. 1, the gas outlet hole 61 is connected to a downstream side of the throttle valve 25 of the intake system 21 (to the intake manifold 26 in the illustrated embodiment) via a blow by gas supply passage 62 formed by a hose or a rigid pipe. As indicated by a black arrow in FIGS. 1 and 3, the gas outlet hole 61 functions as a blow by gas discharge port for discharging blow by gas from the third gas liquid separation passage 58 to the intake system 21.

As shown in FIG. 4, a PCV valve 63 is passed through a right end part of a wall disposed between the second gas liquid separation passage 57 and the third gas liquid separation passage 58. The PCV valve 63 includes a housing defining a valve passage communicating the second gas liquid separation passage 57 with the third gas liquid separation passage 58, a valve seat provided in the valve passage and facing the third gas liquid separation passage 58, a valve member configured to be seated on the valve seat, and a spring member urging the valve member toward the valve seat. The PCV valve 63 is closed in the initial state with the valve member seated on the valve seat under the biasing force of the spring member. When the pressure on the side of the third gas liquid separation passage 58 is lower than the pressure on the side of the second gas liquid separation passage 57 by a prescribed amount, the valve member is lifted from the valve seat against the biasing force of the spring member, thereby opening the PCV valve 63 to permit the flow of gas from the second gas liquid separation passage 57 to the third gas liquid separation passage 58.

As shown in FIG. 2 and FIGS. 4 to 6, a plurality of (seven in the example of FIG. 5) slanted upright walls 70H project upward from the inner surface of the lower wall 70A of the first gas liquid separation passage 70. Each slanted upright wall 70H is formed as a plate member connected to the lower wall 71A of the first gas liquid separation passage 70 along the lower edge thereof and to the front side wall 70C of the first gas liquid separation passage 70 along the front edge thereof.

Each slanted upright wall 70H forms a first angle to a direction orthogonal to the cylinder row direction in plan view such that the rear edge thereof is ahead of the front edge thereof toward the right end side of the first gas liquid separation passage 70. The rear edge of each slanted upright wall 70H is spaced from the rear side wall 70D of the first gas liquid separation passage 70 by a small gap G1. The upper edge of each slanted upright wall 70H is substantially flush with the top wall 41A of the first cover member 41 surrounding the recess 38. The slanted upright walls 70H are arranged along the cylinder row direction substantially at a regular interval in mutually parallel relationship in plan view. In the illustrated embodiment, each slanted upright wall 70H is slightly curved in plan view in such a manner that a part thereof adjacent to the front side wall 70C has a concave side facing leftward, and a part thereof adjacent to the rear side wall 70D has a concave side facing rightward.

As shown in FIGS. 2 and 5, a plurality of (five in the example of FIG. 5) slanted depending walls 70J project downward from the inner surface of the upper wall 70B of the first gas liquid separation passage 70. Each slanted depending wall 70J is formed as a plate member connected to the upper wall 71B of the first gas liquid separation passage 70 along the upper edge thereof and to the front and rear side walls 70C and 70D of the first gas liquid separation passage 70 along the front edge and the rear edge thereof, respectively.

Each slanted depending wall 70J forms a second angle to a direction orthogonal to the cylinder row direction in plan view such that the rear edge thereof is behind the front edge thereof toward the right end side of the first gas liquid separation passage 70. The second angle is thus opposite in sense to the first angle, but, not exclusively, may be substantially equal to the first angle in absolute value. The lower edge of each slanted depending wall 70J is substantially flush with or slightly spaced from the top edges of the slanted upright walls 70H. The slanted depending walls 70J are arranged along the cylinder row direction substantially at a regular interval in mutually parallel relationship in plan view.

The vertical dimension of each slanted depending wall 70J may be about one half of the distance between the lower wall 70A and the upper wall 70B. In plan view, each slanted depending wall 70J intersects at least one of the slanted upright walls 70H. As shown in FIGS. 2 and 5, the lower edges of the slanted depending walls 70J may contact the upper edges of the slanted upright walls 70H at the intersections of the slanted depending walls 70J and the slanted upright walls 70H.

As shown in FIGS. 4 and 6, a counterclockwise helical passage is formed in the first gas liquid separation passage 70 by the slanted upright walls 70H and the slanted depending walls 70J as viewed toward the right direction or in the direction of a blow by gas flow. As a result, when the gas flows from the gas inlet 54 to the gas outlet 59, the gas flows rightward and forward along the slanted depending walls 70J, as indicated by arrows 100 in FIGS. 4 and 6, downward along the front side wall 70C, rightward and rearward along the slanted upright walls 70H, and then upward along the rear side wall 70D. Thus, the blow by gas flows rightward (or toward the gas outlet 59) along a counterclockwise helical path. Conversely, when the gas flows from the gas outlet 59 to the gas inlet 54, the gas flows leftward and rearward along the slanted depending walls 70J, downward along the rear side wall 70D, leftward and forward along the slanted upright walls 70H, and then upward along the front side wall 70C. Thus, the gas flows leftward (or toward the gas inlet 54) along a counterclockwise helical path.

As shown in FIGS. 5 and 6, the upper wall 70B of the first gas liquid separation passage 70 is provided with a longitudinal rib 70K projecting downward and extending in the cylinder row direction substantially over the entire length of the upper wall 70B. The vertical dimension of the longitudinal rib 70K is substantially smaller than the vertical dimension of the slanted depending walls 70J. The inner lower surface of the upper wall 70B of the first gas liquid separation passage 70 is provided with a plurality of transverse ribs 70L projecting downward and extending in a direction orthogonal to the cylinder row direction so as to cross the longitudinal rib 70K. The vertical dimension of the transverse ribs 70L is substantially equal to the vertical dimension of the longitudinal rib 70K.

As shown in FIG. 2 and FIGS. 4 to 6, a lower partition wall 70M projects upward from a part of the inner surface of the lower wall 70A of the first gas liquid separation passage 70 on the left side of the leftmost slanted upright walls 70H. The lower partition wall 70M is formed as a plate member that extends in the fore and aft direction in plan view. The rear edge of the lower partition wall 70M is separated from the rear side wall 70D of the first gas liquid separation passage 70 by a gap G2. The front edge of the lower partition wall 70M is connected to the front side wall 70C of the first gas liquid separation passage 70. The vertical dimension of the lower partition wall 70M is slightly greater than the vertical dimension of the slanted upright walls 70H.

An upper partition wall 70N depends downward from the inner surface of the upper wall 70B of the first gas liquid separation passage 70 on the left side of the lower partition wall 70M. The upper partition wall 70N is formed as a plate member extending in the fore and aft direction in plan view. The rear edge of the upper partition wall 70N is connected to the rear side wall 70D of the first gas liquid separation passage 70, and the front edge of the upper partition wall 70N is connected to the front side wall 70C of the first gas liquid separation passage 70. The vertical dimension of the upper partition wall 70N is greater than the vertical dimension of the slanted depending walls 70J, and in particular the lower edge of the upper partition wall 70N is lower than the upper edge of the lower partition wall 70M, and lower than the inner surface of the upper wall 71B of the gas introduction passage 71.

As shown in FIG. 4, a first side rib 70P projecting forward and extending vertically is provided in a part of the rear side wall 70D of the first gas liquid separation passage 70 immediately to the right side of the gap G2 defined between the rear edge of the lower partition wall 70M and the rear side wall 70D of the first gas liquid separation passage 70. The projecting length of the first side rib 70P is greater than the width of the gap G2. The lower end of the first side rib 70P is connected to the lower wall 70A of the first gas liquid separation passage 70, and the upper end of the first side rib 70P is on a same level as or higher than the lower edge of the upper partition wall 70N.

A plurality of second side ribs 70Q (two in the example of FIG. 5) projecting forward and extending vertically are formed on the rear side wall 70D of the first gas liquid separation passage 70 immediately to the right side of the gaps G1 defined between the rear edge of the second and fourth slanted upright walls 70H as counted from the left end, respectively. The projecting length of each second side rib 70Q is greater than the width of the gap G1. The lower end of each second side rib 70Q is connected to the lower wall 70A of the first gas liquid separation passage 70.

As shown in FIGS. 4 and 6, when gas flows from the gas inlet 54 to the gas outlet 59, the gas flows forward through the gas introduction passage 71 from the gas inlet 54 as shown by an arrow 102, and as the gas advances into the first gas liquid separation passage 70, collides with the lower part of the front side wall 70C of the first gas liquid separation passage 70 before flowing rightward to the first gas liquid separation passage 70.

At this time, as shown in FIG. 4 and FIG. 5, the gas initially collides with the upper partition wall 70N, and flows under the lower edge of the upper partition wall 70N. The gas then collides with the lower partition wall 70M, and flows upward along the lower partition wall 70M before flowing above the upper edge of the lower partition wall 70M. The gas flow is thus forced to change directions a number of times so that any heavy particles such as oil droplets contained in the gas are separated from the gas, and drop onto the inner surface of the lower wall 70A of the first gas liquid separation passage 70. The gas then flows through the spiral path defined by the slanted upright walls 70H and slanted depending walls 70J so that the centrifugal force acting upon the gas flow causes any heavy particles such as oil droplets contained in the gas to be separated from the gas, and drop onto the inner surface of the lower wall 70A of the first gas liquid separation passage 70.

As shown in FIG. 4, a spiral passage is also formed in the second gas liquid separation passage 57 by slanted upright walls 57H extending from the inner surface of the lower wall and slanted depending walls 57J (FIG. 2) extending from the inner surface of the upper wall. The second gas liquid separation passage 57 forms a counterclockwise helical passage extending from the gas inlet hole 55 to the PCV valve 63. The oil separated from the gas in the second gas liquid separation passage 57 flows on the inner surface of the lower wall which is inclined downward to the left, and flows into the gas inlet hole 55. The oil then flows through the blow by gas passage 36, and returns to the oil pan 5.

Similarly, a spiral passage is formed in the third gas liquid separation passage 58 by slanted upright walls 58H extending from the inner surface of the lower wall and slanted depending walls 58J (FIG. 2) extending from the inner surface of the upper wall. The third gas liquid separation passage 58 forms a clockwise helical passage extending from the PCV valve 63 to the gas outlet hole 61. The oil separated from the gas in the third gas liquid separation passage 58 flows into an oil outlet hole (not shown in the drawings) formed in the lower wall of the third gas liquid separation passage 58, and is returned to the oil pan 5 via the valve actuating chamber 44 and the oil return passage 35.

The flow of blow by gas and fresh air in the internal combustion engine 1 described above is discussed in the following.

When the output of the internal combustion engine 1 is relatively low, the turbocharger is not operated. In this case, as shown in FIG. 1, the downstream side of the throttle valve 25 of the intake system 21 is under a negative pressure, and is therefore lower in pressure than the upstream side of the throttle valve 25. The negative pressure on the downstream side of the throttle valve 25 is supplied to the third gas liquid separation passage 58 via the blow by gas supply passage 62, and the PCV valve 63 is opened. As a result, the blow by gas in the crank chamber 11 flows through the blow by gas passage 36 and the gas inlet hole 55, and flows into the second gas liquid separation passage 57. Thereafter, the blow by gas passes through the PCV valve 63, the third gas liquid separation passage 58, the gas outlet hole 61, and the blow by gas supply passage 62 before being supplied to the intake manifold 26 (see the black arrow in FIG. 1).

The oil mist contained in the blow by gas is removed from the blow by gas by adhering to the wall surface of the passage when passing through each passage. The oil mist is removed particularly when passing through the second gas liquid separation passage 57 and the third gas liquid separation passage 58. The blow by gas flows in a spiral path along the length of the second gas liquid separation passage 57 and the third gas liquid separation passage 58 so that the oil mist is thrown radially outward under the centrifugal force, and is removed by adhering to the surrounding wall surfaces as well as to the slanted depending walls 57J and 58J and slanted upright walls 57H and 58H.

At the same time as the blow by gas in the crank chamber 11 is discharged to the intake system 21, fresh air on the upstream side of the throttle valve 25 of the intake system 21 flows through the gas passage 60, the gas outlet 59, the first gas liquid separation passage 70, the gas inlet 54, the valve actuating chamber 44 and the oil return passage 35, in that order, before flowing into the crank chamber 11. As a result, the blow by gas drawn out of the crank chamber 11 is replaced by this fresh air (as indicated by white arrow in FIG. 1). Thus, the gas outlet 59 serves as a fresh air inlet of the first gas liquid separation passage 70, and the gas inlet 54 serves as a fresh air outlet of the first gas liquid separation passage 70.

When the output of the internal combustion engine 1 is high, the turbocharger is operated so that the pressure of the intake system 21 on the downstream side of the compressor 24A is higher than that on the upstream side of the compressor 24A. The positive pressure on the downstream side of the compressor 24A is supplied to the third gas liquid separation passage 58 via the blow by gas supply passage 62, causing the PCV valve 63 to be closed. As a result, the blow by gas in the crank chamber 11 does not flow into the blow by gas passage 36, but, instead, flows through the oil return passage 35, the valve actuating chamber 44, the gas inlet 54, the first gas liquid separation passage 70, the gas outlet 59, and the gas passage 60, before being supplied to the upstream end of the compressor 24A of the intake system 21 (see the black arrow in FIG. 1). In other words, when the output of the internal combustion engine is high, the blow by gas flows through the oil return passage 35, the valve actuating chamber 44, the gas inlet 54, the first gas liquid separation passage 70, the gas outlet 59, and the gas passage 60, in that order or in the opposite direction in which fresh air flows through these parts when the engine output is low.

The oil mist contained in the blow by gas is removed from the blow by gas by adhering to the wall surface of the passage when passing through each passage. The oil mist is removed particularly when passing through the first gas liquid separation passage 70. In the first gas liquid separation passage 70, the blow by gas flows spirally in the longitudinal direction, so that the oil mist moves radially outward of the center line extending in the cylinder row direction due to the centrifugal force, and the oil mist is removed by adhering to the walls 70A to 70F, the slanted upright walls 70H and the slanted depending walls 70J.

The mode of operation of the oil separation device 10 of the internal combustion engine 1 according to the present embodiment is described in the following in regard to the operating condition in which the blow by gas from the crank chamber 11 flows into the first gas liquid separation passage 70.

As shown in FIGS. 2, 5, and 6, in the present embodiment, the gas introduction passage 71 having a cross section smaller than the first gas liquid separation passage 70 is connected to the left end of the first gas liquid separation passage 70 at an angle (which may be substantially equal to 90 degrees), and the gas inlet 54 is formed at an end of the gas introduction passage 71 remote from the first gas liquid separation passage 70. The first gas liquid separation passage 70 extends substantially directly above the exhaust camshaft 47, and the gas introduction passage 71 extends away from the exhaust camshaft 47. Therefore, the oil splashed by the exhaust camshaft 47 is prevented from entering the gas introduction passage 71.

This is particularly the case when the rotational direction of the exhaust camshaft 47 is such that the oil splashed by the exhaust camshaft is thrown away from the gas inlet 54 of the gas introduction passage 71 as shown in FIGS. 2 and 6.

Also, because the gas introduction passage 71 substantially aligns with one of the cam holders 49, the splashed oil is less likely to enter the gas inlet 54. The rib 74 projecting from the outer or lower side of the lower wall 71A and extending in the cylinder row direction further prevents the oil splashed by the exhaust camshaft 47 from entering the gas introduction passage 71 from the gas inlet 54.

The oil mist that enters the gas inlet 54 with the blow by gas collides with the front side wall 70C of the first gas liquid separation passage 70 owing to inertia, and this also causes the oil to be removed from the blow by gas. For a favorable removal of the oil from the gas introduction passage 71, the lower wall 71A of the gas introduction passage 71 is slanted downward toward the gas inlet 54.

As shown in FIGS. 2, 5 and 6, because the inner surface of the upper wall 71B of the gas introduction passage 71 is lower than the inner surface of the upper wall 70B of the first gas liquid separation passage 70, the velocity of the gas entering the first gas liquid separation passage 70 is rapidly reduced while the oil mist keeps traveling substantially at the same velocity so that the oil can be effectively separated from the gas by adhering to the front side wall 70C of the first gas liquid separation passage 70.

Furthermore, the gas entering the first gas liquid separation passage 70 is forced to flow in a lower part of the first gas liquid separation passage 70 by the upper partition wall 70N, and caused to collide with the lower partition wall 70M before ascending along the surface of the lower partition wall 70M facing leftward. This rapid change in the flow direction of the gas causes the oil mist to be separated from the gas.

As shown in FIGS. 5 and 6, the inner surface of the lower wall 71A of the gas introduction passage 71 has a downward gradient toward the gas inlet 54, and the lower wall 70A of the first gas liquid separation passage 70 has a downward slope toward the rear side wall 70D and toward the gas introduction passage 71. Therefore, the oil separated from the gas in the first gas liquid separation passage 70 flows toward the gas introduction passage 71 along the bottom surface of the first gas liquid separation passage 70, particularly along the side of the rear side wall 70D, and along the bottom surface of the gas introduction passage 71 to be finally discharged from the gas inlet 54.

Further, as shown in FIG. 4, the separated oil flows through the gap G2 defined between the lower partition wall 70M and the rear side wall 70D. In the illustrated embodiment, the first side rib 70P is provided on the right side of the gap G2. Therefore, the gas flowing toward the right end of the first gas liquid separation passage 70 is decelerated by the first side rib 70P so that the separated oil flowing through the gap G2 is prevented from being blown toward the right end of the first gas liquid separation passage 70, and can therefore flow toward the gas introduction passage 71 without encountering any significant resistance.

Similarly, the separated oil flows through the gaps G1 defined between the slanted upright walls 70H and the rear side wall 70D. In the illustrated embodiment, the second side ribs 70Q are provided on the right side of at least some of the gaps G1. Therefore, the gas flowing toward the right end of the first gas liquid separation passage 70 is decelerated by the second side ribs 70Q so that the separated oil flowing through the gap G1 is prevented from being blown toward the right end of the first gas liquid separation passage 70, and can therefore flow toward the gas introduction passage 71 without encountering any significant resistance.

Although the present invention has been described in terms of a preferred embodiment thereof, it is obvious to a person skilled in the art that various alterations and modifications are possible without departing from the scope of the present invention. For instance, the first to third gas liquid separation passages 70, 57 and 58 extended and were elongated in the cylinder row direction in the foregoing embodiment, but may also extend and be elongated in an orthogonal direction or any other directions without departing from the spirit of the present invention.

The invention claimed is:

1. An oil separation device of an internal combustion engine, the oil separation device comprising:
 a gas liquid separation chamber defined by a chamber forming member including a lower wall, an upper wall, and a pair of side walls, and elongated in a horizontal first direction;
 a gas introduction passage defined by a passage forming member connected to one of the pair of side walls, the gas introduction passage having a cross sectional area smaller than that of the gas liquid separation chamber, extending in a direction intersecting the gas liquid separation chamber, and connected to a first end of the gas liquid separation chamber;
 a gas inlet formed in an end of the gas introduction passage remote from the gas liquid separation chamber, and opening in a direction of extension of the gas introduction passage; and
 a gas outlet formed in a second end of the gas liquid separation chamber,
 wherein the gas introduction passage and the gas liquid separation chamber jointly form an L shaped gas liquid separation passage,
 the gas introduction passage is provided with a top wall surface which is lower than a top wall surface of the gas liquid separation chamber, and
 the gas liquid separation chamber is provided with an upper partition wall extending downward from the upper wall at a position downstream of a part of the gas liquid separation chamber connected to the gas introduction passage, such that the upper partition wall extends to a position lower than the top wall surface of the gas introduction passage.

2. The oil separation device according to claim 1, wherein the chamber forming member is formed by a part of a head cover of the engine, the head cover defining a valve actuating chamber in cooperation with an upper surface of a cylinder head of the engine, and the valve actuating chamber accommodating a camshaft extending in the first direction substantially directly under the gas liquid separation chamber, the gas inlet being spaced apart from the camshaft in a direction orthogonal to the first direction.

3. The oil separation device according to claim 2, wherein a circumferential motion of the camshaft at a top side thereof is directed from a side of the gas liquid separation chamber to a side of the gas inlet.

4. The oil separation device according to claim 3, wherein the camshaft is supported by a plurality of cam holders via bearings, and the gas introduction passage substantially aligns with one of the cam holders of the plurality of cam holders.

5. The oil separation device according to claim 1, wherein the gas introduction passage is provided with a bottom wall defining a bottom wall surface slanting upward from the gas inlet to the gas liquid separation chamber.

6. The oil separation device according to claim 5, wherein the bottom wall is provided with a depending wall depending downward from a lower surface of the bottom wall adjacent to the gas inlet and extending in the first direction.

7. The oil separation device according to claim 1, wherein a part of the gas liquid separation chamber adjoining the gas introduction passage is provided with an upright wall extending upright from the lower wall and at an angle to the first direction in plan view.

8. The oil separation device according to claim 7, wherein the upper partition wall is provided in a part of the gas liquid separation chamber intermediate between the upright wall and the gas introduction passage.

9. The oil separation device according to claim 7, wherein the upright wall extends from a first side wall of the pair of side walls, and is spaced from a second side wall of the pair of side walls, and a first side rib extends from a part of the second side wall located adjacent to the upright wall from a side remote from the gas introduction passage.

10. The oil separation device according to claim 1, wherein the gas liquid separation chamber is provided with a plurality of slanted upright walls extending from the lower wall at a first angle to a direction orthogonal to the first direction in plan view and arranged in the first direction, and a plurality of slanted depending walls depending from the upper wall at a second angle to the direction orthogonal to the first direction in plan view and arranged in the first direction, the first and second angles being in mutually opposite senses.

11. The oil separation device according to claim 10, wherein the plurality of slanted upright walls is spaced from one side wall of the pair of side walls, and a second side rib extends from a part of the one side wall located adjacent to at least one of the slanted upright walls of the plurality of slanted upright walls from a side remote from the gas introduction passage.

12. The oil separation device according to claim 10, wherein the plurality of slanted upright walls is spaced from one side wall of the pair of side walls, and the gas liquid separation chamber is provided with a bottom wall surface which is slanted downward toward a side of the gas introduction passage and toward the one side wall.

13. The oil separation device according to claim 10, wherein the lower wall is provided with a descending step toward the gas introduction passage.

\* \* \* \* \*